(12) United States Patent
Ramanujam et al.

(10) Patent No.: US 12,054,204 B2
(45) Date of Patent: Aug. 6, 2024

(54) RACK FORCE ESTIMATION FOR STEERING SYSTEMS

(71) Applicant: STEERING SOLUTIONS IP HOLDING CORPORATION, Saginaw, MI (US)

(72) Inventors: Rangarajan Ramanujam, Saginaw, MI (US); Bhuvanesh Sainath, Saginaw, MI (US); Tejas M. Varunjikar, Rochester Hills, MI (US); Prerit Pramod, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 168 days.

(21) Appl. No.: 16/033,579

(22) Filed: Jul. 12, 2018

(65) Prior Publication Data
US 2020/0017139 A1 Jan. 16, 2020

(51) Int. Cl.
*B62D 5/04* (2006.01)

(52) U.S. Cl.
CPC ......... *B62D 5/0463* (2013.01); *B62D 5/0409* (2013.01); *B62D 5/0481* (2013.01)

(58) Field of Classification Search
CPC .. B62D 5/0463; B62D 5/0481; B62D 5/0409; B62D 6/008
See application file for complete search history.

(56) References Cited

U.S. PATENT DOCUMENTS

| | | | | |
|---|---|---|---|---|
| 6,152,254 A | * | 11/2000 | Phillips | B62D 5/065 180/421 |
| 6,250,419 B1 | * | 6/2001 | Chabaan | B62D 6/10 180/443 |
| 6,314,353 B1 | * | 11/2001 | Ohsaku | B60G 17/018 701/1 |

(Continued)

FOREIGN PATENT DOCUMENTS

| | | | | |
|---|---|---|---|---|
| CA | 2338230 A1 | * | 2/2000 | ............ B62D 6/008 |
| CA | 2359201 A1 | * | 4/2002 | ........... G06F 3/0481 |

(Continued)

OTHER PUBLICATIONS

Chinese Office Action and Search Report received from the Chinese Patent Office for related Chinese Application No. 201910630699.2 dated Sep. 3, 2021, 10 pages.

(Continued)

*Primary Examiner* — Donald J Wallace
*Assistant Examiner* — Jalal C Coduroglu
(74) *Attorney, Agent, or Firm* — Dickinson Wright PLLC (57) ABSTRACT

According to one or more embodiments of the technical solutions described herein, a method for generating torque in a steering system includes computing, by a controller, a lateral velocity of a vehicle using a vehicle model that uses a vehicle velocity, a surface friction estimate, a tire-angle, and at least one of a measured yaw rate from a yaw rate sensor and a lateral acceleration. The method further includes generating, by the controller, a torque command for providing assist torque to a driver, the torque command is (Continued)

based on the lateral velocity that is computed. The method further includes providing, by a motor, the assist torque, which is an amount of torque corresponding to the torque command.

8 Claims, 5 Drawing Sheets

(56) References Cited

U.S. PATENT DOCUMENTS

| | | | | |
|---|---|---|---|---|
| 6,415,215 B1* | 7/2002 | Nishizaki | B60T 8/1755 | 180/167 |
| 6,651,771 B2* | 11/2003 | Chabaan | B62D 6/10 | 701/42 |
| 7,853,379 B2* | 12/2010 | Klier | B62D 5/008 | 701/41 |
| 8,150,582 B2* | 4/2012 | Blommer | B62D 5/0472 | 701/44 |
| 8,788,147 B2* | 7/2014 | Strecker | G01L 5/221 | 180/443 |
| 9,037,353 B2* | 5/2015 | Di Cairano | B62D 6/008 | 701/42 |
| 9,776,656 B2* | 10/2017 | Wilhelm | B62D 5/0463 | |
| 9,845,109 B2* | 12/2017 | George | B62D 6/006 | |
| 9,988,043 B2* | 6/2018 | Mahabadi | B60W 50/0097 | |
| 2001/0041957 A1* | 11/2001 | McCann | B62D 6/003 | 701/41 |
| 2002/0019690 A1* | 2/2002 | Kurishige | B62D 5/0466 | 701/41 |
| 2002/0121402 A1* | 9/2002 | Takeuchi | B62D 5/0472 | 180/446 |
| 2003/0130775 A1* | 7/2003 | Lu | B60T 8/17551 | 701/36 |
| 2003/0151835 A1* | 8/2003 | Su | B60R 1/00 | 359/843 |
| 2003/0191569 A1* | 10/2003 | Su | B60R 1/07 | 701/49 |
| 2003/0213641 A1* | 11/2003 | Nakano | B62D 5/008 | 180/446 |
| 2004/0200661 A1* | 10/2004 | Sugitani | B62D 6/008 | 180/402 |
| 2007/0198152 A1* | 8/2007 | Endo | G08G 1/161 | 701/41 |
| 2008/0021614 A1* | 1/2008 | Endo | B62D 6/008 | 701/41 |
| 2008/0059034 A1* | 3/2008 | Lu | B60T 8/17552 | 701/71 |
| 2008/0082246 A1* | 4/2008 | Brown | B60W 30/045 | 701/91 |
| 2008/0109134 A1* | 5/2008 | Bolourchi | B62D 6/002 | 180/443 |
| 2008/0142292 A1* | 6/2008 | Bayer | B62D 5/087 | 180/441 |
| 2010/0070135 A1* | 3/2010 | Wang | B62D 5/0472 | 701/41 |
| 2010/0131144 A1* | 5/2010 | Ryu | B60W 40/103 | 701/79 |
| 2010/0131145 A1* | 5/2010 | Ryu | B60T 8/172 | 701/31.4 |
| 2010/0131146 A1* | 5/2010 | Nardi | B60T 8/172 | 701/31.4 |
| 2010/0131229 A1* | 5/2010 | Nardi | B60T 8/172 | 702/142 |
| 2010/0268422 A1* | 10/2010 | Blommer | B62D 5/0472 | 701/44 |
| 2011/0022270 A1* | 1/2011 | Tamaizumi | B62D 5/0463 | 701/41 |
| 2013/0253769 A1* | 9/2013 | Kamo | A61G 5/04 | 701/42 |
| 2014/0005894 A1* | 1/2014 | Aoki | B62D 6/001 | 701/43 |
| 2014/0324294 A1* | 10/2014 | Champagne | B62D 5/049 | 701/41 |
| 2014/0365097 A1* | 12/2014 | Kujubu | B60T 8/1755 | 701/72 |
| 2016/0075371 A1* | 3/2016 | Varunjikar | B62D 5/049 | 701/43 |
| 2016/0185384 A1* | 6/2016 | Kodera | B62D 5/0469 | 701/41 |
| 2016/0280251 A1* | 9/2016 | George | B62D 6/006 | |
| 2016/0288825 A1* | 10/2016 | Varunjikar | B62D 6/006 | |
| 2016/0297439 A1* | 10/2016 | Inoue | B60W 10/20 | |
| 2017/0158227 A1* | 6/2017 | Katzourakis | B62D 6/008 | |
| 2017/0232998 A1* | 8/2017 | Ramanujam | B62D 6/008 | 701/42 |
| 2017/0305458 A1* | 10/2017 | Wang | B60W 50/00 | |
| 2017/0355396 A1* | 12/2017 | Varunjikar | B62D 6/002 | |
| 2018/0015948 A1* | 1/2018 | Varunjikar | B62D 6/00 | |
| 2018/0037222 A1* | 2/2018 | Mahabadi | B60W 40/103 | |
| 2018/0086368 A1* | 3/2018 | Patel | B62D 5/0484 | |
| 2018/0086371 A1* | 3/2018 | Wang | B62D 5/0481 | |
| 2018/0105206 A1* | 4/2018 | Gullven | B62D 6/04 | |
| 2018/0106714 A1* | 4/2018 | Skold | B60T 8/1764 | |
| 2018/0229761 A1* | 8/2018 | Fujita | B62D 5/046 | |
| 2018/0297605 A1* | 10/2018 | Kasaiezadeh Mahabadi | | B60W 50/0205 |
| 2018/0362022 A1* | 12/2018 | Kasaiezadeh Mahabadi | | B60W 30/045 |
| 2019/0031231 A1* | 1/2019 | George | B62D 5/0463 | |
| 2019/0039641 A1* | 2/2019 | Toda | B62D 6/008 | |
| 2019/0047618 A1* | 2/2019 | Hultén | B60W 10/30 | |
| 2019/0256126 A1* | 8/2019 | George | B62D 6/008 | |
| 2019/0270482 A1* | 9/2019 | Nakakuki | B62D 5/0409 | |
| 2020/0017139 A1* | 1/2020 | Ramanujam | B62D 5/0481 | |
| 2020/0039580 A1* | 2/2020 | Redeker | B62D 7/148 | |

FOREIGN PATENT DOCUMENTS

| | | | | |
|---|---|---|---|---|
| CN | 101460121 A | * | 6/2009 | ......... A61F 13/5148 |
| CN | 101565043 A | * | 10/2009 | ............ B60T 8/1755 |
| CN | 101565043 A | | 10/2009 | |
| CN | 101716951 A | * | 6/2010 | ........... B62D 5/0472 |
| CN | 102730055 A | | 10/2012 | |
| CN | 102971201 A | * | 3/2013 | ........... B62D 5/0472 |
| CN | 106004994 A | * | 10/2016 | ............ B62D 6/006 |
| CN | 106256645 A | | 12/2016 | |
| CN | 107499373 A | * | 12/2017 | .............. B62D 5/04 |
| CN | 107933562 A | * | 4/2018 | ............ B60T 8/1764 |
| CN | 107963187 A | * | 4/2018 | ............. B63B 35/50 |
| DE | 102009022592 A1 | * | 12/2010 | ............. B60T 8/172 |
| DE | 102010030986 A1 | * | 1/2012 | ............. B62D 6/008 |
| DE | 102014114751 A1 | * | 4/2015 | ........ B60W 40/068 |
| DE | 10247994 B4 | * | 10/2018 | ............. B62D 37/00 |
| DE | 102018117975 A1 | | 1/2019 | |
| DE | 102019116949 A1 | | 1/2020 | |
| DE | 112018006928 T5 | | 1/2021 | |
| EP | 3006306 A1 | * | 4/2016 | ........... B62D 5/0463 |
| EP | 3072782 A1 | * | 9/2016 | ........... B62D 5/0481 |
| EP | 3006306 B1 | * | 2/2018 | ........... B62D 5/0484 |
| EP | 3309026 A1 | * | 4/2018 | ............ B60T 8/1764 |
| EP | 3569436 A1 | * | 11/2019 | .............. B60T 8/175 |
| JP | 2018047725 A | * | 3/2018 | ............... B62D 5/04 |
| KR | 1020090027494 A | | 3/2009 | |
| RU | 73277 U1 | * | 1/2008 | ......... B60W 40/068 |
| WO | WO-2013182257 A1 | * | 12/2013 | ............ B60W 50/14 |
| WO | WO-2017187492 A1 | * | 11/2017 | ........... B62D 5/0463 |
| WO | WO-2018055805 A1 | * | 3/2018 | ............. B62D 6/008 |
| WO | WO-2019152888 A1 | * | 8/2019 | ............ G05D 1/0289 |

OTHER PUBLICATIONS

Second Chinese Office Action mailed Mar. 17, 2022 for Chinese Application No. 201910630699.2, 3 pages.
Official Letter received from the German Patent and Trademark Office for related German Patent Application No. 102019118831.8 dated Mar. 28, 2023, 12 pages.

* cited by examiner

RACK FORCE ESTIMATION FOR STEERING SYSTEMS

BACKGROUND

The present application is generally related to estimating rack force value in steering systems, and particularly to providing a rack force estimate in real-time and independent of steering system signals.

Electric Power Steering (EPS) system substantially contributes to the (lateral) dynamic performance of a vehicle using the EPS by providing to a driver a feedback according to the road surface disturbances, tire load, and other forces experienced by a vehicle rack. Response of the EPS system to driver inputs as well as external inputs (e.g. tire forces) affects yaw rate, roll rate, and lateral (Y) motion of the vehicle as well as hand-wheel rim forces experienced by a driver. Further, the EPS generates compensatory torque to alleviate some of the disturbances to facilitate a smoother drive for the driver. Further yet, the EPS generates assist torque to reduce the effort required by the driver when maneuvering the vehicle and overcoming the external forces. Accordingly, accurate effort communication and steering feel under all environmental conditions (e.g. icy surfaces and conditions beyond tire limits where undesirable yaw behavior such as oversteer, understeer etc. observed) greatly affect the overall performance of the vehicle.

SUMMARY

According to one or more embodiments of the technical solutions described herein, a method for generating torque in a steering system includes computing, by a controller, a lateral velocity of a vehicle using a vehicle model that uses a vehicle velocity, a surface friction estimate, a tire-angle, and at least one of a measured yaw rate from a yaw rate sensor and a lateral acceleration. The method further includes generating, by the controller, a torque command for providing assist torque to a driver, the torque command is based on the lateral velocity that is computed. The method further includes providing, by a motor, the assist torque, which is an amount of torque corresponding to the torque command.

According to one or more embodiments, a steering system includes a motor for generating torque, a lateral velocity estimation module, and a motor control system. The lateral velocity estimation module computes a lateral velocity of a vehicle using a vehicle model that uses a vehicle velocity, a surface friction estimate, a tire-angle, and at least one of a lateral acceleration and a measured yaw rate from a sensor. The motor control system generates a torque command for providing assist torque to a driver, the torque command is based on the lateral velocity that is computed. Further, the motor provides an assist torque, which is an amount of torque corresponding to the torque command.

According to one or more embodiments, a computer program product includes a storage device having computer executable instructions stored therein. The computer executable instructions when executed by a controller cause generating a torque in a steering system. Generating the torque includes computing a lateral velocity of a vehicle using a vehicle model that uses a vehicle velocity, a surface friction estimate, a tire-angle, and at least one of a lateral acceleration and a measured yaw rate from a sensor. Further, generating the torque includes generating a torque command for providing assist torque to a driver, the torque command is based on the lateral velocity that is computed. Further, generating the torque includes providing, by a motor, the assist torque, which is an amount of torque corresponding to the torque command.

These and other advantages and features will become more apparent from the following description taken in conjunction with the drawings.

BRIEF DESCRIPTION OF THE DRAWINGS

The subject matter of the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the Figures, where the present disclosure will be described with reference to specific embodiments, without limiting the same, it is to be understood that the disclosed embodiments are merely illustrative of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

Figure 1:
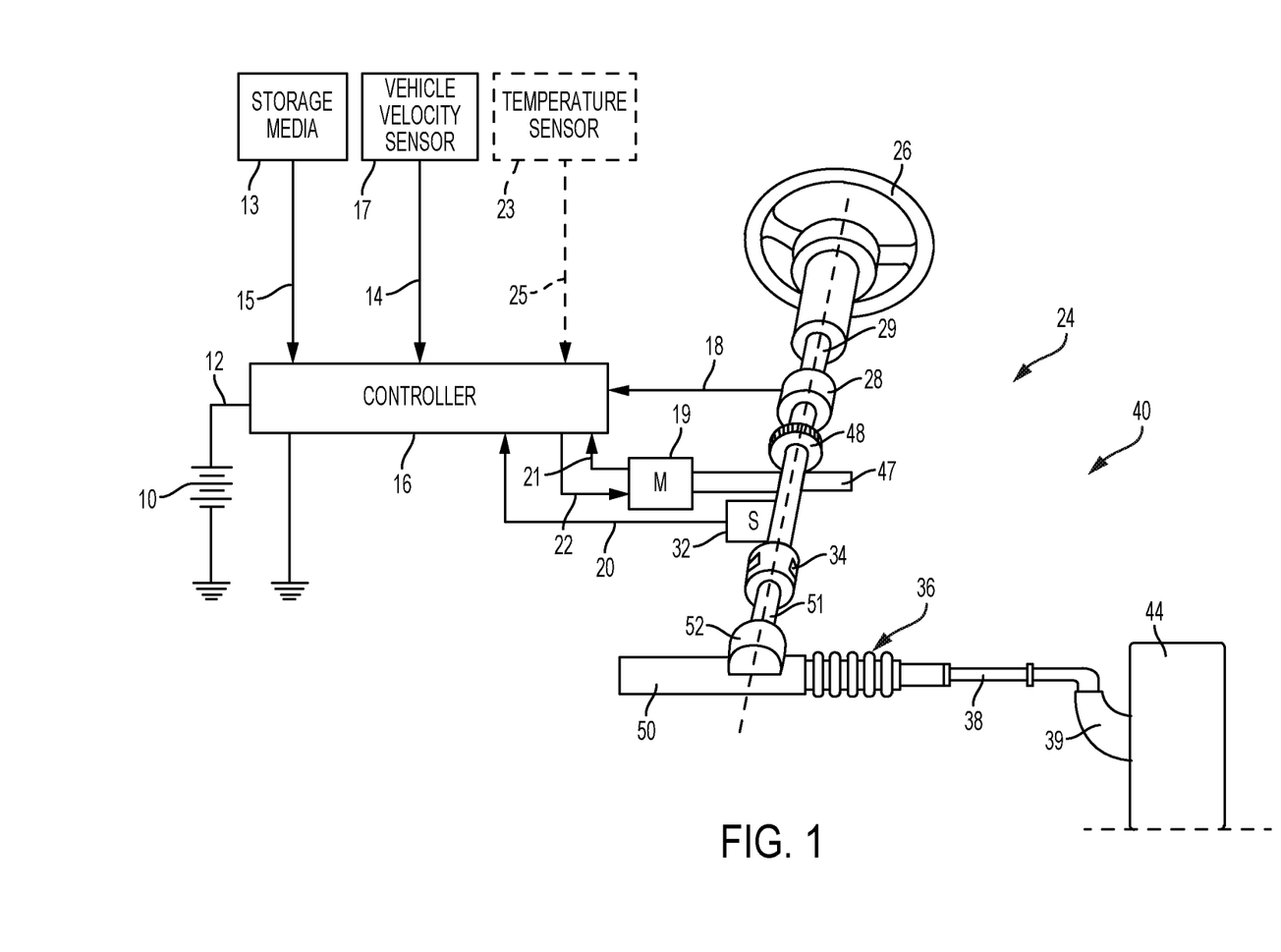
FIG. 1 is an exemplary embodiment of an electric power steering system according to one or more embodiments.

It is desirable to for a steering system to perform real time estimation of rack forces. Referring now to the Figures, where the technical solutions will be described with reference to specific embodiments, without limiting same, FIG. 1 is an exemplary embodiment of an electric power steering system (EPS) 40 suitable for implementation of the disclosed embodiments. The steering mechanism 36 is a rack-and-pinion type system and includes a toothed rack (not shown) within housing 50 and a pinion gear (also not shown) located under gear housing 52. As the operator input, hereinafter denoted as a steering wheel 26 (e.g. a hand wheel and the like) is turned, the upper steering shaft 29 turns and the lower steering shaft 51, connected to the upper steering shaft 29 through universal joint 34, turns the pinion gear. Rotation of the pinion gear moves the rack, which moves tie rods 38 (only one shown) in turn moving the steering knuckles 39 (only one shown), which turn a steerable wheel(s) 44 (only one shown).

Electric power steering assist is provided through the control apparatus generally designated by reference numeral 24 and includes the controller 16 and an electric machine 19, which could be a permanent magnet synchronous motor, and is hereinafter denoted as motor 19. The controller 16 is powered by the vehicle power supply 10 through line 12. The controller 16 receives a vehicle speed signal 14 representative of the vehicle velocity from a vehicle velocity sensor 17. Steering angle is measured through position sensor 32, which may be an optical encoding type sensor, variable resistance type sensor, or any other suitable type of position sensor, and supplies to the controller 16 a position signal 20. Motor velocity may be measured with a tachometer, or any other device, and transmitted to controller 16 as a motor velocity signal 21. A motor velocity denoted $\omega_m$ may be measured, calculated or a combination thereof. For example, the motor velocity $\omega_m$ may be calculated as the change of the motor position θ as measured by a position sensor 32 over a prescribed time interval. For example, motor speed $\omega_m$ may be determined as the derivative of the motor position θ from the equation $\omega_m = \Delta\theta/\Delta t$ where $\Delta t$ is the sampling time and $\Delta\theta$ is the change in position during the sampling interval. Alternatively, motor velocity may be derived from motor position as the rate of change of position with respect to time. It will be appreciated that there are numerous well-known methodologies for performing the function of a derivative.

As the steering wheel 26 is turned, torque sensor 28 senses the torque applied to the steering wheel 26 by the vehicle operator. The torque sensor 28 may include a torsion bar (not shown) and a variable resistive-type sensor (also not shown), which outputs a variable torque signal 18 to controller 16 in relation to the amount of twist on the torsion bar. Although this is one type of torque sensor, any other suitable torque-sensing device used with known signal processing techniques will suffice. In response to the various inputs, the controller sends a command 22 to the electric motor 19, which supplies torque assist to the steering system through worm 47 and worm gear 48, providing torque assist to the vehicle steering.

It should be noted that although the disclosed embodiments are described by way of reference to motor control for electric steering applications, it will be appreciated that such references are illustrative only and the disclosed embodiments may be applied to any motor control application employing an electric motor, e.g., steering, valve control, and the like. Moreover, the references and descriptions herein may apply to many forms of parameter sensors, including, but not limited to torque, position, speed and the like. It should also be noted that reference herein to electric machines including, but not limited to, motors, hereafter, for brevity and simplicity, reference will be made to motors only without limitation.

In the control system 24 as depicted, the controller 16 utilizes the torque, position, and speed, and like, to compute a command(s) to deliver the required output power. Controller 16 is disposed in communication with the various systems and sensors of the motor control system. Controller 16 receives signals from each of the system sensors, quantifies the received information, and provides an output command signal(s) in response thereto, in this instance, for example, to the motor 19. Controller 16 is configured to develop the corresponding voltage(s) out of inverter (not shown), which may optionally be incorporated with controller 16 and will be referred to herein as controller 16, such that, when applied to the motor 19, the desired torque or position is generated. In one or more examples, the controller 24 operates in a feedback control mode, as a current regulator, to generate the command 22. Alternatively, in one or more examples, the controller 24 operates in a feedforward control mode to generate the command 22. Because these voltages are related to the position and speed of the motor 19 and the desired torque, the position and/or speed of the rotor and the torque applied by an operator are determined. A position encoder is connected to the steering shaft 51 to detect the angular position θ. The encoder may sense the rotary position based on optical detection, magnetic field variations, or other methodologies. Typical position sensors include potentiometers, resolvers, synchros, encoders, and the like, as well as combinations comprising at least one of the forgoing. The position encoder outputs a position signal 20 indicating the angular position of the steering shaft 51 and thereby, that of the motor 19.

Desired torque may be determined by one or more torque sensors 28 transmitting torque signals 18 indicative of an applied torque. One or more exemplary embodiments include such a torque sensor 28 and the torque signal(s) 18 therefrom, as may be responsive to a compliant torsion bar, T-bar, spring, or similar apparatus (not shown) configured to provide a response indicative of the torque applied.

In one or more examples, a temperature sensor(s) 23 located at the electric machine 19. Preferably, the temperature sensor 23 is configured to directly measure the temperature of the sensing portion of the motor 19. The temperature sensor 23 transmits a temperature signal 25 to the controller 16 to facilitate the processing prescribed herein and compensation. Typical temperature sensors include thermocouples, thermistors, thermostats, and the like, as well as combinations comprising at least one of the foregoing sensors, which when appropriately placed provide a calibratable signal proportional to the particular temperature.

The position signal 20, velocity signal 21, and a torque signal(s) 18 among others, are applied to the controller 16. The controller 16 processes all input signals to generate values corresponding to each of the signals resulting in a rotor position value, a motor speed value, and a torque value being available for the processing in the algorithms as prescribed herein. Measurement signals, such as the above mentioned are also commonly linearized, compensated, and filtered as desired to enhance the characteristics or eliminate undesirable characteristics of the acquired signal. For example, the signals may be linearized to improve processing speed, or to address a large dynamic range of the signal. In addition, frequency or time based compensation and filtering may be employed to eliminate noise or avoid undesirable spectral characteristics.

In order to perform the prescribed functions and desired processing, as well as the computations therefore (e.g., the identification of motor parameters, control algorithm(s), and the like), controller 16 may include, but not be limited to, a processor(s), computer(s), DSP(s), memory, storage, register(s), timing, interrupt(s), communication interface(s), and input/output signal interfaces, and the like, as well as combinations comprising at least one of the foregoing. For example, controller 16 may include input signal processing and filtering to enable accurate sampling and conversion or acquisitions of such signals from communications interfaces. Additional features of controller 16 and certain processes therein are thoroughly discussed at a later point herein.

As described herein, it is desirable to for the steering system 12 to perform real time estimation of rack forces to facilitate providing assist torque to the driver. Further, the rack force estimate can be used for alleviating, at least partially, external forces acting on the steering system 12 to provide a smoother ride to the driver, such as by compensating for tire load, road disturbances, and the like, by generating counteracting torque.

Typically, steering tuning engineers tune the steering system using algorithms that depend on measured driver torque, handwheel angle, and steering rate, to get a desired steering performance. In such cases, gain tables and filters are directly applied to the measured driver torque to get base assist torque, which is the substantial portion of a final motor torque in most driving conditions. There has been an increasing trend towards structuring EPS algorithms in a way where the desired driver torque assist is defined using vehicle states (e.g. using estimated rack force). In such a structure, the tuning may be performed in a way that handwheel efforts are directly based on the estimated rack forces. Such assist command generation structures are applicable to closed loop handwheel torque controlled steering systems, steer-by-wire (SbW) systems and even to conventional steering systems.

A technical challenge for using such techniques in the steering system 12 is estimating the rack force. Typically, known techniques for computing rack force estimates use open-loop vehicle models are tuned for dry roads and can have mismatch in some tire limit conditions. Alternatively, known techniques that use an observer-based rack force estimation utilize EPS signals for the estimation. Such an approach estimates rack force accurately under varying conditions (dry, wet, icy roads) and successfully communicates road disturbances (texture, pothole, friction change etc.) to the driver, however, for driver effort calculations that result in smoother steering feel, the vehicle model based approaches are preferred.

Vehicle models, such as the well-known bicycle model, are useful for understanding vehicle dynamics and various states of the vehicle including the lateral velocity, slip angles, and lateral acceleration, among others. While vehicle models provide such information, they have lower bandwidth due to their open-loop nature. Further, the vehicle models are not valid at non-linear regions of the tire and are sensitive to environmental conditions. Thus, open-loop vehicle model based approaches become severely tuning intensive for guaranteeing robustness, posing a technical challenge in using a vehicle model based approach to estimate the rack force.

The technical solutions described herein addresses such technical challenge(s) by facilitating the steering system 12 to use a closed-loop vehicle model based observer that estimates various vehicle states in real-time. The observer utilizes a vehicle model, such as a bicycle model, along with yaw rate measurements to estimate the lateral velocity, which is in turn used to compute the slip angles. Thereafter, the slip angle is used to estimate the lateral acceleration and force, which is then used to determine the rack force. While the rack force estimate may be used to determine driver effort curves and thereby provide the desired steering feel performance, the various vehicle state estimates may further be used for multiple other purposes including understeer-oversteer detection (lateral velocity), handwheel torque loss of assist mitigation (lateral acceleration), continuous friction estimation, and other such steering system functions. Further, the closed-loop observer estimation of rack force including nonlinearities also facilitates a uniform rack force build-up on-center due to bicycle model validity in the linear range of the tire. Further yet, the technical solutions facilitate accurate rack force estimation in the nonlinear tire range. The technical solutions described herein are valid at higher vehicle speeds (above a predetermined threshold, such as above 20 MPH, 40 MPH, and the like) and uses surface friction information which may be obtained using an existing friction estimation technique.

Figure 2:
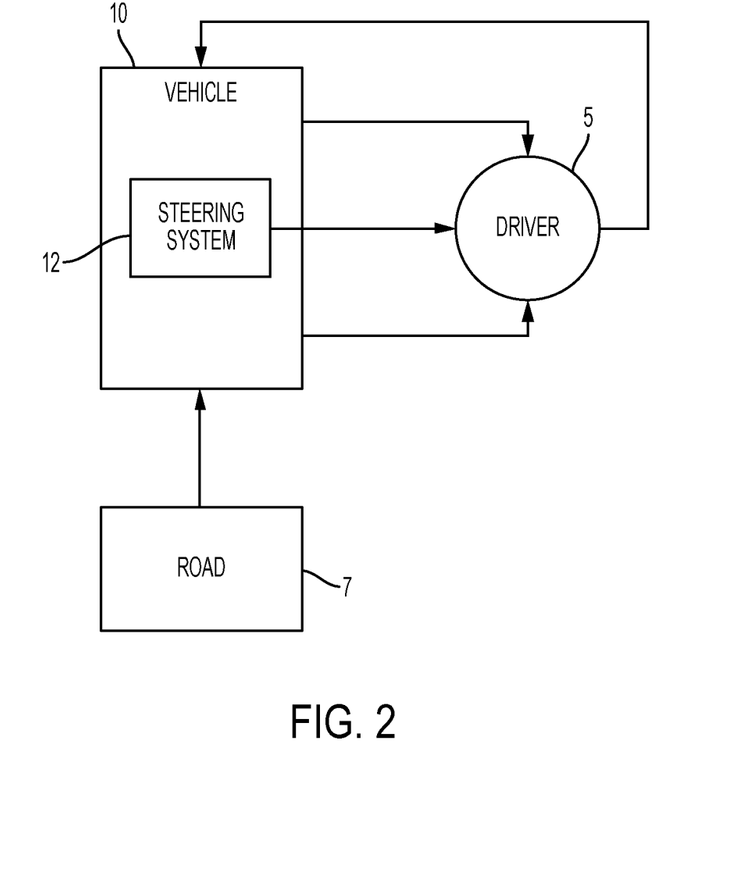
FIG. 2 depicts an interaction of a vehicle with the steering system and the road according to an exemplary scenario.

FIG. 2 depicts an interaction of a vehicle with the steering system and the road according to an exemplary scenario. As depicted, the vehicle 10 experiences external inputs, such as tire forces, from the road 7 that the vehicle 10 is traveling on. Further, the driver 5 provides input forces such as engine throttle, braking, steering angle, and the like. As a result, one or more forces/parameters are generated via the vehicle and its sub-components, like the steering system 12, and the driver 5 receives such forces/parameters as feedback. For example, the driver 5 experiences motion in X, Y, and Z directions; yaw, pitch, and roll motion; feedback from handwheel 26; and other types of feedback such as suspension etc.

Figure 3:
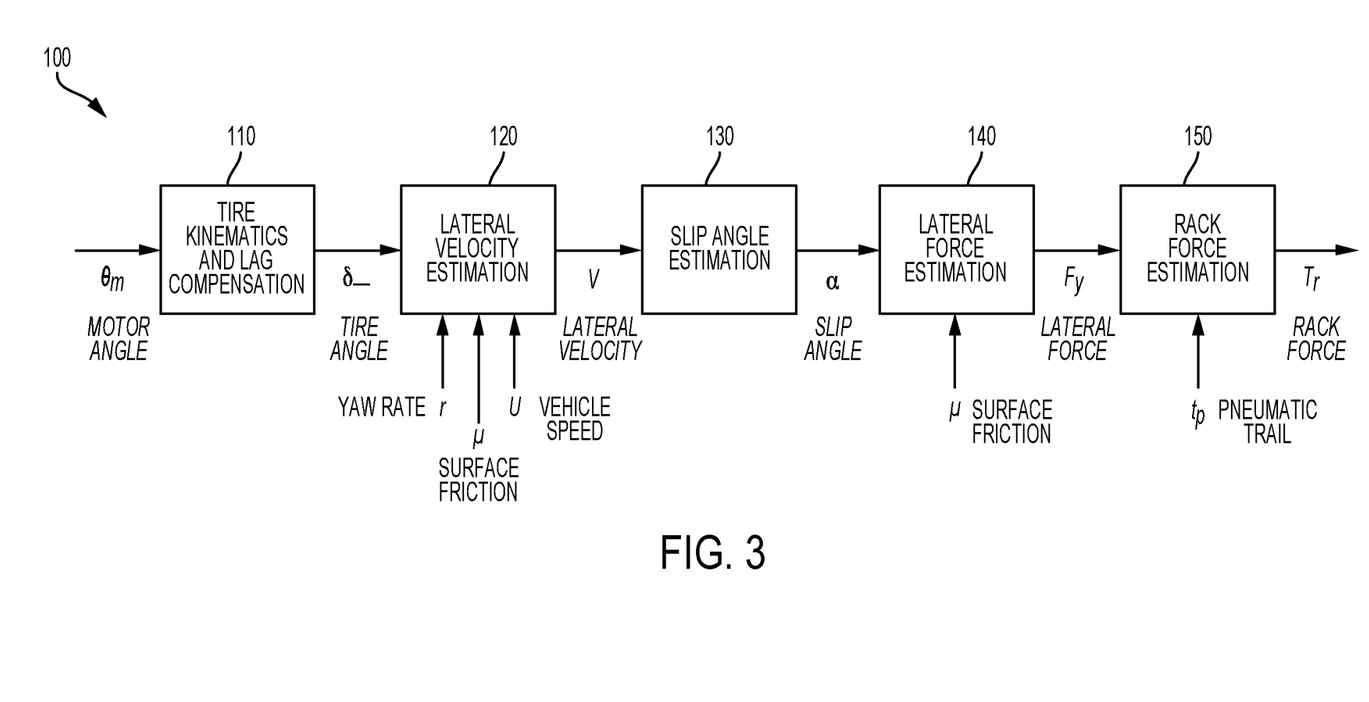
FIG. 3 depicts a block diagram of an operational flow for estimating rack force according to one or more embodiments of the present invention.

FIG. 3 depicts a block diagram of an operational flow for estimating rack force according to one or more embodiments of the present invention. The rack force is estimated using a closed loop rack force observer using a vehicle model, such as a bicycle model. In one or more examples, the controller 24 executes the method for estimating the rack force. Alternatively, or in addition, a rack force estimation module implements the method providing the estimated rack force to the controller and/or other components for further functionality.

The method uses a state observer based on a vehicle model, such as the bicycle model, to estimate the lateral velocity V of the vehicle 10, at 120. The inputs to the state observer include a measured yaw rate r, a surface friction coefficient $\mu$, and a (front) tire angle $\delta_f$. In one or more examples, the tire angle may be obtained from the motor angle $\theta$ using a kinematic model of the tire along with appropriate lag compensation, at 110. The motor angle can be determined using a position sensor for the motor 19, or in any other manner.

The state equations of the plant used for constructing the state observer are as follows:

$$\dot{x} = Ax + Bu$$

$$\begin{bmatrix} \dot{V} \\ \dot{r} \end{bmatrix} = \begin{bmatrix} \dfrac{C_{\alpha f} + C_{\alpha r}}{mU} & \dfrac{aC_{\alpha f} - bC_{\alpha r}}{mU} - U \\ \dfrac{aC_{\alpha f} - bC_{\alpha r}}{I_{zz}U} & \dfrac{a^2 C_{\alpha f} + b^2 C_{\alpha r}}{I_{zz}U} \end{bmatrix} \begin{bmatrix} V \\ r \end{bmatrix} + \begin{bmatrix} -\dfrac{C_{\alpha f}}{m} \\ -\dfrac{aC_{\alpha f}}{I_{zz}} \end{bmatrix} \delta_f$$

$$y = Cx$$

$$[V] = [0 \ 1] \begin{bmatrix} V \\ r \end{bmatrix}$$

Here, m is the vehicle mass, $I_{zz}$ is the z-axis mass moment of inertia about the vehicle CG, $C_{\alpha f}$ and $C_{\alpha r}$ are front and rear cornering stiffness, a and b are the distances of the front and rear axles along the x-axis from the CG and U is the vehicle speed. Such values are either known values for the specific vehicle 10, measured dynamically using one or more corresponding sensors, and/or dynamically computed using one or more sensor measurements. The state observer output includes the lateral velocity V and yaw rate (r), where the yaw rate is measured by a sensor.

In one or more examples, instead of the yaw rate, a lateral acceleration measured by a sensor can be used.

In one or more examples, the lateral velocity V is estimated using an alternative observer structure that is based on a modified bicycle model. The state equations for the plant used for constructing the observer in this case are as follows:

$$\dot{x} = Ax + Bu$$

$$x = \begin{bmatrix} V & \dot{V} & r \end{bmatrix}^T$$

$$u = \begin{bmatrix} \delta_f & \dot{\delta}_f \end{bmatrix}^T$$

$$A = \begin{bmatrix} 0 & 1 & 0 \\ \left(\frac{aC_{\alpha f} - bC_{\alpha r}}{mU} - U\right) & \frac{C_{\alpha f} + C_{\alpha r}}{mU} & \left(\frac{aC_{\alpha f} - bC_{\alpha r}}{mU} - U\right) \\ \left(\frac{aC_{\alpha f} - bC_{\alpha r}}{I_{zz}U}\right) & & \left(\frac{a^2C_{\alpha f} + -b^2C_{\alpha r}}{I_{zz}U}\right) \\ \frac{aC_{\alpha f} - bC_{\alpha r}}{I_{zz}U} & 0 & \frac{a^2C_{\alpha f} + b^2C_{\alpha r}}{I_{zz}U} \end{bmatrix}$$

$$B = \begin{bmatrix} 0 & 0 \\ \left(\frac{aC_{\alpha f} - bC_{\alpha r}}{mU} - U\right)\left(-\frac{aC_{\alpha f}}{I_{zz}}\right) & -\frac{C_{\alpha f}}{m} \\ -\frac{aC_{\alpha f}}{I_{zz}} & 0 \end{bmatrix}$$

where $\dot{\delta}_f$ is the tire velocity, which is the derivative of the tire angle, and is modeled as an additional input in the augmented model, and may be calculated by differentiating the tire angle signal. Note that the only actual input to the system is the tire angle. However, for the purposes of observer design using the augmented state matrix that includes lateral acceleration as an additional system state, the tire velocity may be modeled as an additional input. Further, the observer structure may be further modified by making simplifying assumptions, such as setting tire velocity to zero etc.

The measurements used in the observer computations can include a yaw rate (r) or lateral acceleration ($\alpha_y$) or a combination of both; such values either measured by corresponding sensors, or computed as described herein using steering system measurement signals. Depending upon the measurement value used in the state equation computations, the output matrices used for the observer can be any one of the following sets:

$$y = Cx$$

$$[a_y] = [0 \ 1 \ U]\begin{bmatrix} V \\ \dot{V} \\ r \end{bmatrix};$$

$$y = Cx$$

$$[r] = [0 \ 0 \ 1]\begin{bmatrix} V \\ \dot{V} \\ r \end{bmatrix}; \text{ or}$$

$$y = Cx\begin{bmatrix} r \\ a_y \end{bmatrix} = \begin{bmatrix} 0 & 0 & 1 \\ 0 & 1 & U \end{bmatrix}\begin{bmatrix} V \\ \dot{V} \\ r \end{bmatrix}$$

In the above computations m is the vehicle mass, $I_{zz}$ is the z-axis mass moment of inertia about the vehicle's center of gravity (CG), $C_{\alpha f}$ and $C_{\alpha r}$ are front and rear cornering stiffness, a and b are the distances of the front and rear axles along the x-axis from the CG, and U is the vehicle speed. Further, the inputs to the observer include measured lateral acceleration $\alpha_y$, (and/or) the measured yaw rate (which can be optional), the surface friction coefficient µ, and a front tire angle $\delta_f$. The tire angle may be obtained from the motor angle θ using a kinematic model of the tire along with appropriate lag compensation.

The state observer with a gain matrix L may be constructed as follows:

$$\dot{\hat{x}} = A\hat{x} - Bu + L(y - \hat{y})$$

$$= (A - LC)\hat{x} + Bu + Ly$$

The transfer matrix of the observer is obtained by taking the Laplace transform of the above equation. It should be noted that the observer gain selection may be performed through any of the well-known methods including pole placement, LQG etc. Alternatively, or in addition, the observer gains may also be determined to achieve a specific transfer function for the lateral velocity estimate as a function of the tire angle and/or yaw rate. The lateral velocity V is accordingly continuously estimated using a closed loop control.

The lateral velocity estimate is then used along with the tire angle to obtain the front and rear slip angles $\alpha_f$ and $\alpha_r$ respectively, at 130. In one or more examples, the slip angles can be determined using the following expressions.

$$\alpha_f = \frac{V + ar}{U} - \delta_f$$

$$\alpha_r = \frac{V - br}{U}$$

Further yet, the slip angle estimates are used to compute the lateral tire force $F_y$, at 140. While linear tire models may be used, they are typically insufficient for representing the complete tire force versus slip angle curves (which are substantially nonlinear, particularly at higher slip angles above a predetermined threshold). Nonlinear tire models that account for the surface friction (which may be received from other estimation algorithms) include empirical models, or physics based models such as the Fiala tire model as shown below.

$$F_y = \begin{cases} -C_\alpha \tan \alpha + \frac{C_\alpha^2}{3}|\tan \alpha|\tan \alpha \ I_f - \frac{C_\alpha^3}{3}\tan^3 \alpha \ I_f^2, & |\alpha| \le \alpha_{sl} \\ -\frac{1}{I_f}\text{sgn } \alpha, & |\alpha| > \alpha_{sl} \end{cases}$$

In one or more examples, the front and rear tire forces $F_{yf}$ and $F_{yr}$ may be computed by using the front and rear cornering stiffness $C_{\alpha f}$ and $C_{\alpha r}$, and $\alpha_f$ and $\alpha_r$, respectively in the above equation. Further, the sliding slip angle $\alpha_{sl}$ and inverse maximum lateral tire force (function of friction µ) are expressed as follows.

$$\alpha_{sl} = \tan^{-1}\left(\frac{3}{C_\alpha I_f}\right)$$

$I_f$=µN where N represents the vertical load of the axle.

The rack force estimate is further computed, at 150. The rack force can be estimated as the product of the front axle lateral force and pneumatic trail, which is the distance between the geometric center of the tire contact patch and the resultant force due to side-slip. In one or more examples, the pneumatic trail is modeled using either an empirical model or a physics based model such as the Fiala model as shown below.

$$t_p = \begin{cases} t_{po}\dfrac{1 - 3|\theta_y\sigma_y| + 3|\theta_y\sigma_y|^2 - |\theta_y\sigma_y|^3}{1 - |\theta_y\sigma_y| + \dfrac{1}{3}|\theta_y\sigma_y|^2}, & |\alpha| \leq \alpha_{sl} \\ 0 & |\alpha| > \alpha_{sl} \end{cases}$$

Here, $\alpha_y = \tan\alpha$ and $$\theta_y = \frac{C_\alpha I_f}{3}.$$

Figure 4:
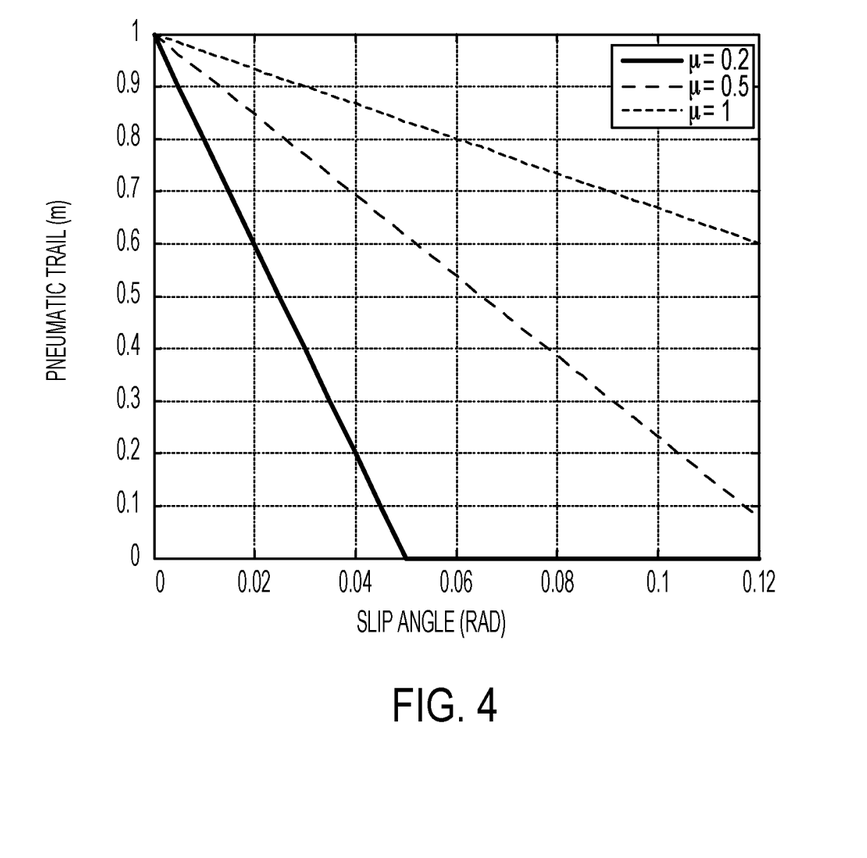
FIG. 4 shows an example variation of pneumatic trail with slip angle and surface friction.

Additionally, because the pneumatic trail varies significantly with surface friction, the model is modified to account for it. The variation of pneumatic trail with slip angle and surface friction is shown in FIG. 4. It is understood that the model shown for varying the pneumatic trail with slip angle and surface friction is one example, and that other models can be used in other examples.

The rack force is calculated as the product of the front axle lateral force $F_{yf}$ and pneumatic trail $t_p$ as follows:

$$T_r = t_p F_{yf}$$

The results of the estimated rack force according to one or more embodiments of the present invention when compared with the actual data collected from an in-vehicle maneuver provide an accurate estimation of all the vehicle states as well as the steering rack force. The technical solutions described herein thus provide a rack force estimate independent of steering system signals. Further, in some embodiments, the use of non-linear models for estimation of the one or more signals used for estimating the rack force, helps in accurately determining system state estimates over a wider operation region of the vehicle and steering system including the linear and non-linear regions of the tire, as compared to a linear model.

According to one or more embodiments of the present invention, the rack force value that is estimated is utilized by the steering system 12 for one or more operations.

Figure 5:
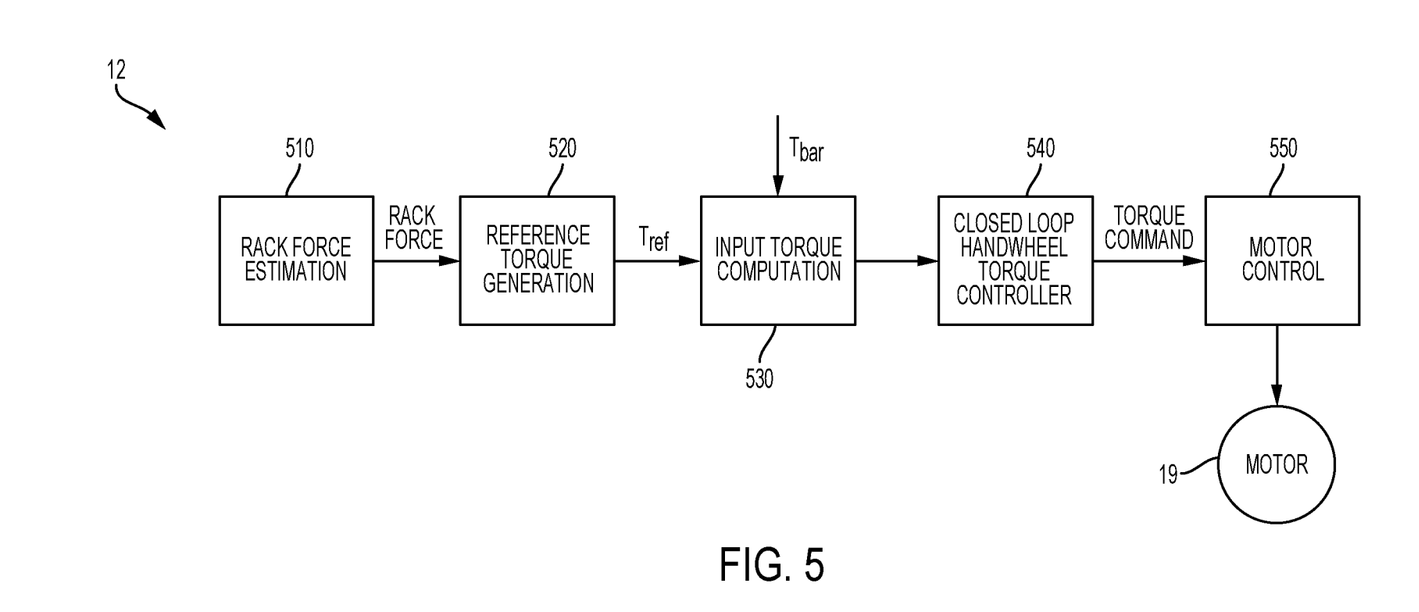
FIG. 5 depicts a torque generation using estimated rack force according to one or more embodiments of the present invention.

FIG. 5 depicts a torque generation using estimated rack force according to one or more embodiments of the present invention. In the depicted example, the rack force is estimated using one or more embodiments described herein, at 510. The rack force is used to generate a reference torque command ($T_{ref}$), at 520. In one or more examples, the reference torque command is generated based on a look-up table that includes one or more reference curves that provide the desired reference torque to be generated for the estimated rack force value. The reference torque command is used by the steering system 12 to generate an assist torque at the handwheel using the motor 19.

Further, in one or more examples, the reference torque command is modified using a handwheel torque ($T_{bar}$) signal, measured at the handwheel 26, at 530. In one or more examples, the measured handwheel torque is subtracted from the reference torque values and the resultant torque error is used by a closed loop handwheel torque control system to generate a torque command for generating the assist torque for the driver 5, at 540, via a motor control system (not shown). The torque command can be applied to the motor 19 in the form of a current command/voltage command to generate the assist torque. A motor control system 550 converts the torque command into the corresponding voltage/current command that is applied to the motor 19. In one or more examples, the motor control system is operated by the controller 24.

The technical solutions described herein accordingly facilitate a closed-loop observer utilizing vehicle models and signals to provide high bandwidth estimate of the rack force using the bicycle model and measured yaw rate, and other vehicle signals. The estimation further provides estimates of additional vehicle states, such as lateral velocity, slip angles, and lateral forces, among others. The technical solutions herein accordingly provide a rack force estimate independent of steering system signals. By using non-linear models for estimation of different signals, the technical solutions described herein provide results in the system state estimates that are valid across the entire operation region of the vehicle and steering system—linear and non-linear regions. The rack force estimates are thus provided using a closed loop observer that are more accurate than typical techniques used, and also at higher bandwidth and without intensive tuning that typical rack force estimation requires. The technical solutions described herein improve rack force estimation used in typical steering systems.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in scope with the present disclosure. Additionally, while various embodiments of the present disclosure have been described, it is to be understood that aspects of the present disclosure may include only some of the described embodiments or combinations of the various embodiments. Accordingly, the present disclosure is not to be seen as limited by the foregoing description.

Having thus described the present disclosure, it is claimed:

1. A method for generating torque in a steering system, the method comprising:
computing, by a controller, a rack force estimate of the steering system using a non-linear vehicle model that uses a lateral velocity estimate that is based on a vehicle velocity, a surface friction estimate, a tire lateral rotational angle, tire lateral rotational velocity, and at least one of a measured yaw rate from a yaw rate sensor and a lateral acceleration, wherein:
the rack force estimate is computed using a closed-loop state observer,
the lateral velocity estimate is estimated using the closed-loop state observer based on a non-linear modified bicycle model using a closed loop calculation,
the tire lateral rotational velocity is a derivative of the tire lateral rotational angle, and
a plant used for constructing the closed-loop state observer is defined at least according to:

$$\dot{x} = Ax + Bu$$

$$x = \begin{bmatrix} V & \dot{V} & r \end{bmatrix}^T$$

-continued $$u = \begin{bmatrix} \delta_f & \dot{\delta}_f \end{bmatrix}^T$$

$$A = \begin{bmatrix} 0 & 1 & 0 \\ \left(\frac{aC_{\alpha f} - bC_{\alpha r}}{mU} - U\right)\left(\frac{aC_{\alpha f} - bC_{\alpha r}}{I_{zz}U}\right) & \frac{C_{\alpha f} + C_{\alpha r}}{mU} & \left(\frac{aC_{\alpha f} - bC_{\alpha r}}{mU} - U\right)\left(\frac{a^2 C_{\alpha f} + b^2 C_{\alpha r}}{I_{zz}U}\right) \\ \frac{aC_{\alpha f} - bC_{\alpha r}}{I_{zz}U} & 0 & \frac{a^2 C_{\alpha f} + b^2 C_{\alpha r}}{I_{zz}U} \end{bmatrix}$$

$$B = \begin{bmatrix} 0 & 0 \\ \left(\frac{aC_{\alpha f} - bC_{\alpha r}}{mU} - U\right)\left(-\frac{aC_{\alpha f}}{I_{zz}}\right) & -\frac{C_{\alpha f}}{m} \\ -\frac{aC_{\alpha f}}{I_{zz}} & 0 \end{bmatrix}$$

where V is lateral velocity, r is yaw rate, m is the vehicle mass, $I_{zz}$ is the z-axis mass moment of inertia about the vehicle center of gravity (CG), $C_{\alpha f}$ and $C_{\alpha r}$ are front and rear cornering stiffness, a and b are the distances of the froth and rear axles along the x-axis from the CG, U is the vehicle speed, $\dot{\delta}_f$ the tire velocity, which is the derivative of the tire angle;

calculating at least a front slip angle and a rear slip angle using the lateral velocity estimate;

updating the rack force estimate based on a product of a front axle lateral force and a pneumatic trail value associated with a pneumatic trail model, the pneumatic trail model using at least one of the front slip angle and the rear slip angle, wherein the pneumatic trail model is modified based on the surface friction estimate, the tire lateral rotational angle being determined based on a motor angle using a kinematic model of a tire associated with the tire lateral rotational angle, wherein the kinematic model is adjusted to compensate for at least corresponding lag, and wherein the motor angle is determined based on an angular position of a steering shaft of the steering system received from a position encoder;

generating, by the controller, a torque command for providing assist torque to a driver, the torque command is based on the rack force estimate, wherein the torque command represents an emulated driver effort, the emulated driver effort being representative of a handwheel torque; and providing, by a motor, the assist torque, which is an amount of torque corresponding to the torque command.

2. The method of claim 1, further comprising:
computing, by the controller, the tire lateral rotational angle of a front tire based on a position of the motor.

3. The method of claim 1, wherein the handwheel torque corresponds to a closed-loop handwheel torque control system.

4. A steering system comprising:
a motor for generating torque; and
a controller that:
computes vehicle rack force estimate using a non-linear vehicle model that uses a lateral velocity estimate that is based on a vehicle velocity, a surface friction estimate, a tire lateral rotational angle, tire lateral rotational velocity, and at least one of a measured yaw rate from a sensor and a lateral acceleration, wherein:
the rack force estimate is computed using a closed-loop state observer
the lateral velocity estimate is estimated using closed-loop state observer based on a non-linear modified bicycle model that uses a closed loop calculation,
the tire lateral rotational velocity is a derivative of the tire lateral rotational angle, and
a plant used for constructing the closed-loop state observer is defined at least according to:

$$\dot{x} = Ax + Bu$$

$$x = \begin{bmatrix} V & \dot{V} & r \end{bmatrix}^T$$

$$u = \begin{bmatrix} \delta_f & \dot{\delta}_f \end{bmatrix}^T$$

$$A = \begin{bmatrix} 0 & 1 & 0 \\ \left(\frac{aC_{\alpha f} - bC_{\alpha r}}{mU} - U\right)\left(\frac{aC_{\alpha f} - bC_{\alpha r}}{I_{zz}U}\right) & \frac{C_{\alpha f} + C_{\alpha r}}{mU} & \left(\frac{aC_{\alpha f} - bC_{\alpha r}}{mU} - U\right)\left(\frac{a^2 C_{\alpha f} + b^2 C_{\alpha r}}{I_{zz}U}\right) \\ \frac{aC_{\alpha f} - bC_{\alpha r}}{I_{zz}U} & 0 & \frac{a^2 C_{\alpha f} + b^2 C_{\alpha r}}{I_{zz}U} \end{bmatrix}$$

$$B = \begin{bmatrix} 0 & 0 \\ \left(\frac{aC_{\alpha f} - bC_{\alpha r}}{mU} - U\right)\left(-\frac{aC_{\alpha f}}{I_{zz}}\right) & -\frac{C_{\alpha f}}{m} \\ -\frac{aC_{\alpha f}}{I_{zz}} & 0 \end{bmatrix}$$

where V is lateral velocity, r is yaw rate, m is the vehicle mass, $I_{zz}$ is the z-axis mass moment of inertia about the vehicle center of gravity (CG), $C_{\alpha f}$ and $C_{\alpha r}$ are front and rear cornering stiffness, a and b are the distances of the front and rear axles along the x-axis is from the CG, U is the vehicle speed, $\dot{\delta}_f$ is the tire velocity, which is the derivative of the tire angle;

calculates at least a front slip and a rear slip angle using the lateral velocity estimate;

updates the rack force estimate based on a product of a front axle lateral force and a pneumatic trail value associated with a pneumatic trail model, the pneumatic trail model using at least one of the front slip angle and the rear slip angle, wherein the pneumatic trail model is modified based on the surface friction estimate, the tire lateral rotational angle being determined based on a motor angle using a kinematic model of a tire associated with the tire lateral rotational angle, wherein the kinematic model is adjusted to compensate for at least corresponding lag, and wherein the motor angle is determined based on an angular position of a steering shaft of the steering system received from a position encoder;

generates a torque command for providing assist torque to a driver, the torque command is based on the rack force estimate, wherein the torque command represents an emulated driver effort, the emulated driver effort being representative of a handwheel torque; and the motor provides an assist torque, which is an amount of torque corresponding to the torque command.

5. The steering system of claim 4, wherein the controller computes the tire lateral rotational angle of a front tire based on a position of the motor.

6. The steering system of claim 4, wherein the handwheel torque corresponds to a closed-loop handwheel torque control system.

7. A computer program product comprising a storage device having computer executable instructions stored therein, the computer executable instructions when executed by a controller cause generating a torque in a steering system, the generating comprising:

computing a rack for estimate for the steering system using a non-linear vehicle model that uses a lateral velocity estimate that is based on a vehicle velocity, a surface friction estimate, a tire lateral rotational angle, tire lateral rotational velocity, and at least one of a measured yaw rate from a sensor and a lateral acceleration, wherein:

the rack force estimate is computed using a closed-loop state observer, the lateral velocity estimate is estimated using closed-loop state observer based on a non-linear modified bicycle model using a closed loop calculation, the tire lateral rotational velocity is a derivative of the tire lateral rotational angle, and a plant used for constructing the closed-loop state observer is defined at least according to:

$$\dot{x} = Ax + Bu$$

$$x = \begin{bmatrix} V & \dot{V} & r \end{bmatrix}^T$$

$$u = \begin{bmatrix} \delta_f & \dot{\delta}_f \end{bmatrix}^T$$

$$A = \begin{bmatrix} 0 & 1 & 0 \\ \left(\frac{aC_{\alpha f} - bC_{\alpha r}}{mU} - U\right)\left(\frac{aC_{\alpha f} - bC_{\alpha r}}{I_{zz}U}\right) & \frac{C_{\alpha f} + C_{\alpha r}}{mU} & \left(\frac{aC_{\alpha f} - bC_{\alpha r}}{mU} - U\right)\left(\frac{a^2 C_{\alpha f} + b^2 C_{\alpha r}}{I_{zz}U}\right) \\ \frac{aC_{\alpha f} - bC_{\alpha r}}{I_{zz}U} & 0 & \frac{a^2 C_{\alpha f} + b^2 C_{\alpha r}}{I_{zz}U} \end{bmatrix}$$

$$B = \begin{bmatrix} 0 & 0 \\ \left(\frac{aC_{\alpha f} - bC_{\alpha r}}{mU} - U\right)\left(-\frac{aC_{\alpha f}}{I_{zz}}\right) & -\frac{C_{\alpha f}}{m} \\ -\frac{aC_{\alpha f}}{I_{zz}} & 0 \end{bmatrix}$$

where V is lateral velocity, r is yaw rate, m is the vehicle mass, $I_{zz}$ is the z-axis mass moment of inertia about the vehicle center of gravity (CG), $C_{\alpha f}$ and $C_{\alpha r}$ are front and rear cornering stiffness, a and b are the distances of the front and rear axles along the x-axis from the CG, U is the vehicle speed, $\dot{\delta}_f$ is the tire velocity, which is the derivative of the tire angle;

calculating at least a front slip angle and a rear slip angle using the lateral velocity estimate;

updating the rack force estimate based on a product of a front axle lateral force and a pneumatic trail value associated with a pneumatic trail model, the pneumatic trail model using at least one of the front slip angle and the rear slip angle, wherein the pneumatic trail model is modified based on the surface friction estimate, the tire lateral rotational angle being determined based on a motor angle using a kinematic model of a tire associated with the tire lateral rotational angle, wherein the kinematic model is adjusted to compensate for at least corresponding lag, and wherein the motor angle is determined based on an angular position of a steering shaft of the steering system received from a position encoder;

generating a torque command for providing assist torque to a driver, the torque command is based on the rack force estimate, wherein the torque command represents an emulated driver effort, the emulated driver effort being representative of a handwheel torque; and providing, by a motor, the assist torque, which is an amount of torque corresponding to the torque command.

8. The computer program product of claim 7, wherein generating the torque further comprises:

computing the tire lateral rotational angle of a front tire based on a position of the motor.

* * * * *